(12) United States Patent
Rapp

(10) Patent No.: US 8,182,593 B2
(45) Date of Patent: May 22, 2012

(54) SYSTEM AND METHOD FOR REDUCING EMISSIONS IN A HOG CONFINEMENT FACILITY

(76) Inventor: Gary L. Rapp, Carroll, IA (US)

( * ) Notice: Subject to any disclaimer, the term of this patent is extended or adjusted under 35 U.S.C. 154(b) by 0 days.

(21) Appl. No.: 13/180,023

(22) Filed: Jul. 11, 2011

(65) Prior Publication Data

US 2012/0006746 A1 Jan. 12, 2012

Related U.S. Application Data

(60) Provisional application No. 61/363,428, filed on Jul. 12, 2010.

(51) Int. Cl.
*B01D 47/00* (2006.01)
*B01D 53/14* (2006.01)

(52) U.S. Cl. ............... 96/271; 96/322; 96/361; 95/214; 95/232; 55/385.1; 119/436; 119/444; 119/450; 119/448; 119/479; 119/529

(58) Field of Classification Search ................... None
See application file for complete search history.

(56) References Cited

U.S. PATENT DOCUMENTS

| | | | |
|---|---|---|---|
| 3,181,503 A | 5/1965 | Tripp | |
| 5,666,905 A * | 9/1997 | Mackin et al. | 119/448 |
| 5,865,143 A * | 2/1999 | Moore, Jr. | 119/442 |
| 5,911,195 A | 6/1999 | Tripp et al. | |
| 6,276,304 B1 * | 8/2001 | Tai | 119/448 |
| 2003/0205205 A1 * | 11/2003 | Opfel | 119/526 |
| 2004/0050338 A1 * | 3/2004 | Ford | 119/437 |
| 2004/0149235 A1 * | 8/2004 | Pogue et al. | 119/479 |
| 2011/0061601 A1 * | 3/2011 | Correa et al. | 119/437 |

* cited by examiner

*Primary Examiner* — Duane Smith
*Assistant Examiner* — Pankti Patel
(74) *Attorney, Agent, or Firm* — Zarley Law Firm, P.L.C.

(57) ABSTRACT

A system and method of reducing ammonia emissions. The system and method include a facility having a waste storage compartment below a floor comprised of slats with openings therebetween. A plurality of injection pipes are attached to a bottom surface of the slats. Each of the plurality of injection pipes includes a plurality of precipitation nozzles.

6 Claims, 6 Drawing Sheets

SYSTEM AND METHOD FOR REDUCING EMISSIONS IN A HOG CONFINEMENT FACILITY

CROSS REFERENCE TO RELATED APPLICATION

This application claims the benefit of U.S. Provisional Application No. 61/363,428 filed Jul. 12, 2010.

BACKGROUND OF THE INVENTION

This invention relates to hog confinement facilities. More specifically, this invention relates to a system and method of reducing ammonia emissions produced at a hog confinement facility.

Hog confinement facilities house a plurality of hogs therein and produce massive amounts of waste including hog feces and urine. In a typical hog facility a plurality of slats are provided on the floor that are spaced apart to provide enough space between the slats so that feces and urine fit through the slats while the slats are not far enough apart that piglets get their feet caught therein. Typically, these slats are slanted in one direction and a waste storage compartment is placed underneath the slats so that the waste is conveyed and removed. Specifically, hogs tend to walk on their own feces and as they trample over the top of the feces it is pushed in between the slats into the waste containment area.

While the slats provide a way for hog feces and urine to be placed in a compartment underneath the facility keeping the facility itself relatively clean, the feces produce large amounts of ammonia, or Nh3. Specifically, fecal matter and urine is attacked by the aerobic bacteria such that when the bacteria begin to consume and start breaking down the fecal matter and urine, the ammonia emissions become airborne. In this activity of decomposition ammonia is the most abundant and the United States Environmental Protection Agency has now officially set standards that regulate the amount of emissions acceptable for release coming from hog operations on a daily accumulations schedule not to exceed 100 pounds per day.

Therefore, a principal object of the present invention is to reduce the amount of ammonia emissions produced at a hog facility.

SUMMARY OF THE INVENTION

A system and method of reducing ammonia emissions includes a facility having a waste storage compartment below a floor comprised of slats with openings therebetween. A plurality of injection pipes are attached to a bottom surface of the slats. Each of the plurality of injection pipes includes a plurality of precipitation nozzles.

DESCRIPTION OF THE PREFERRED EMBODIMENT

Figure 1:
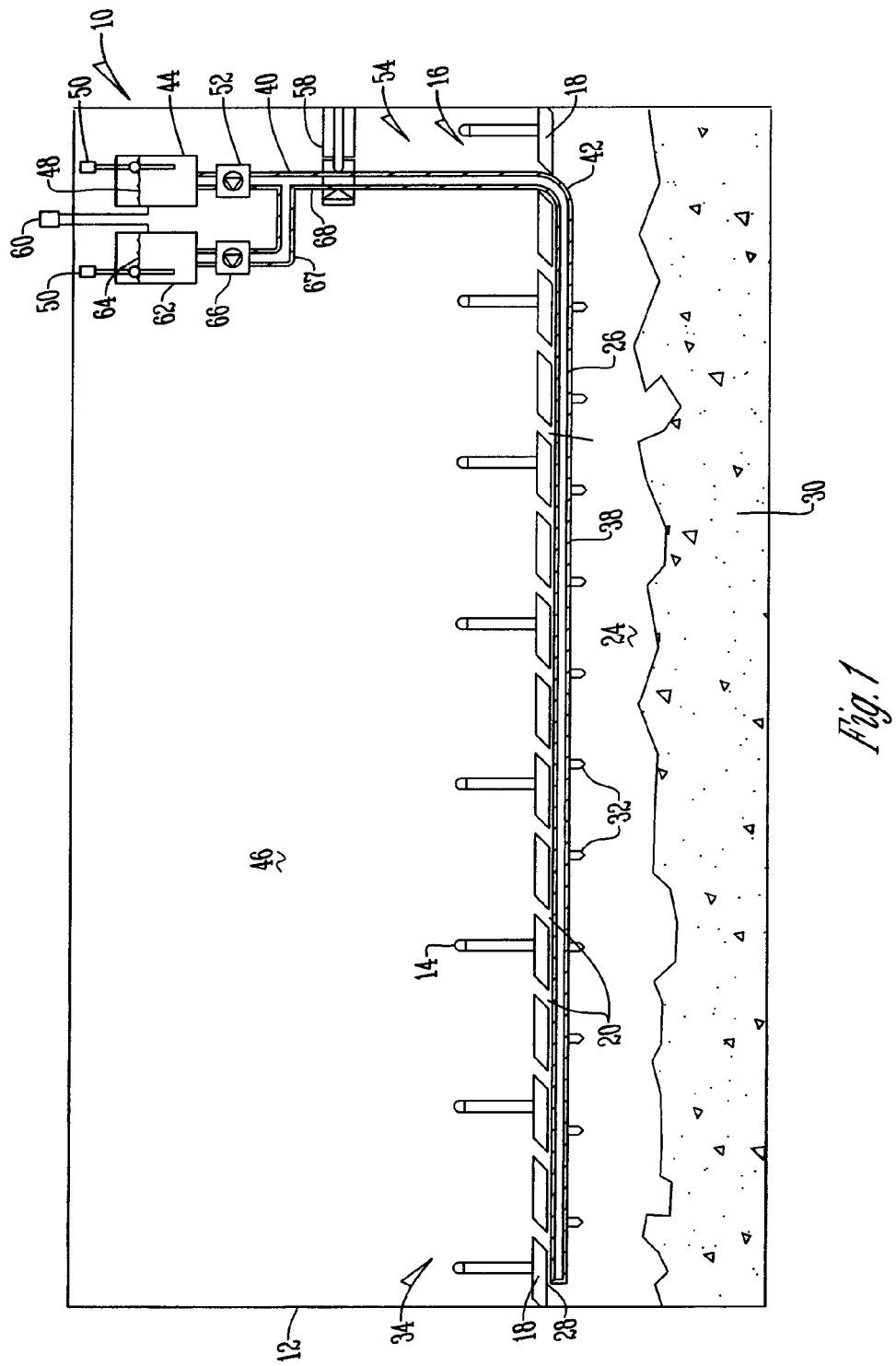
FIG. 1 is a perspective view in partial cross section of the system of reducing ammonia emissions produced at a hog confinement facility of the present invention.
Figure 2:
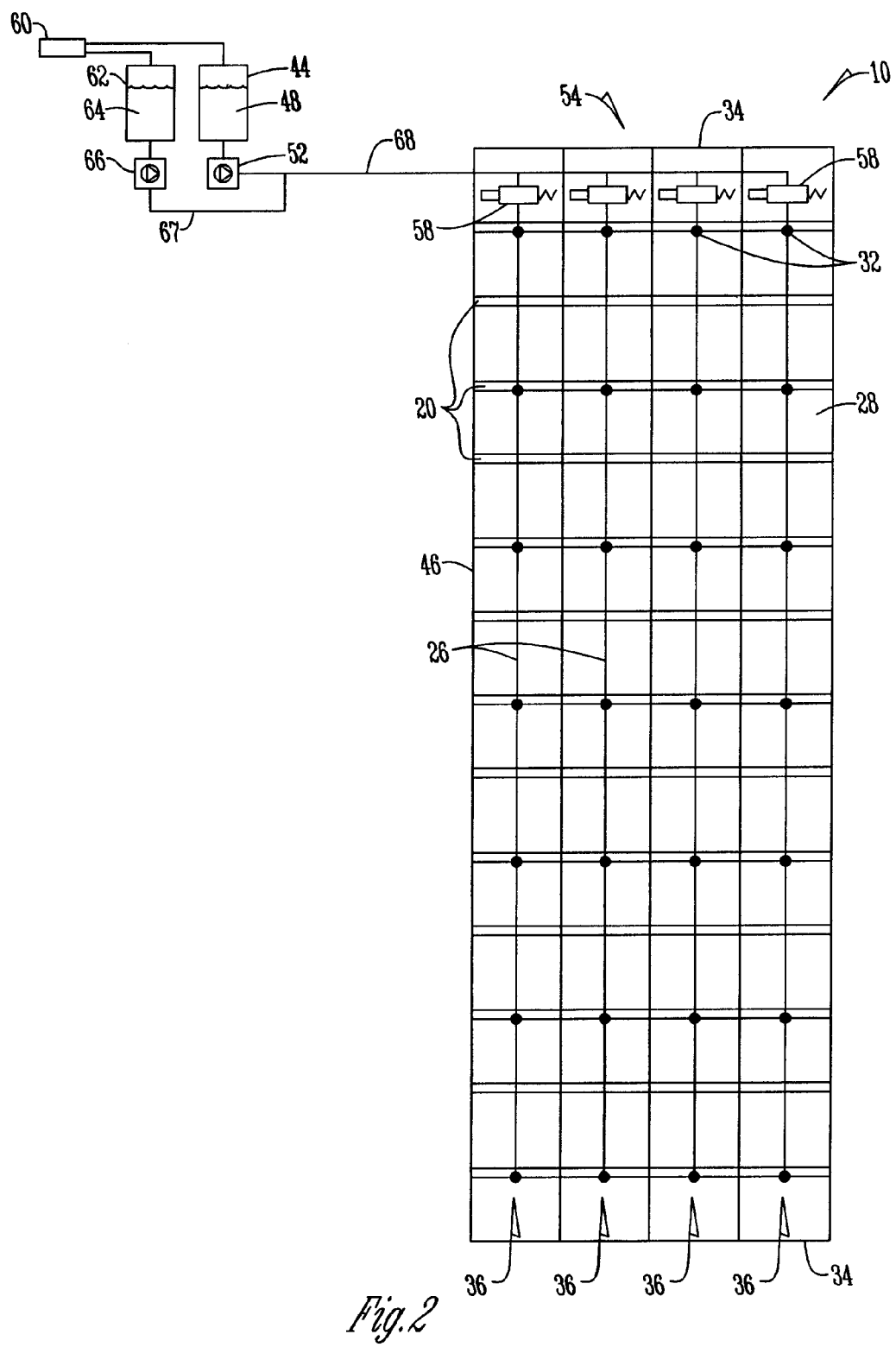
FIG. 2 is a schematic view in partial cross section of the system of reducing ammonia emissions produced at a hog confinement facility of the present invention.
Figure 3:
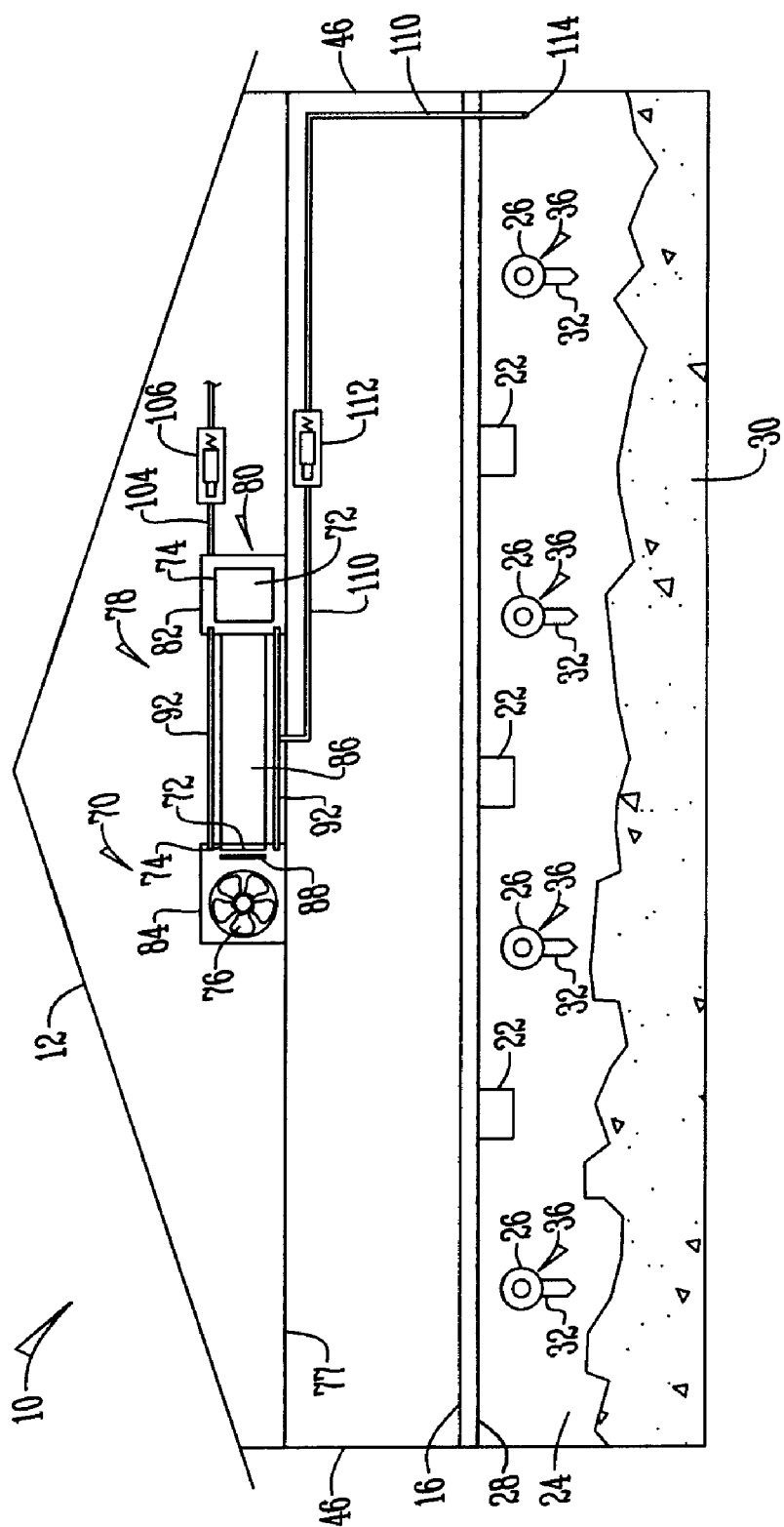
FIG. 3 is a perspective view in partial cross section of the system of reducing ammonia emissions produced at a hog confinement facility of the present invention.
Figure 4:
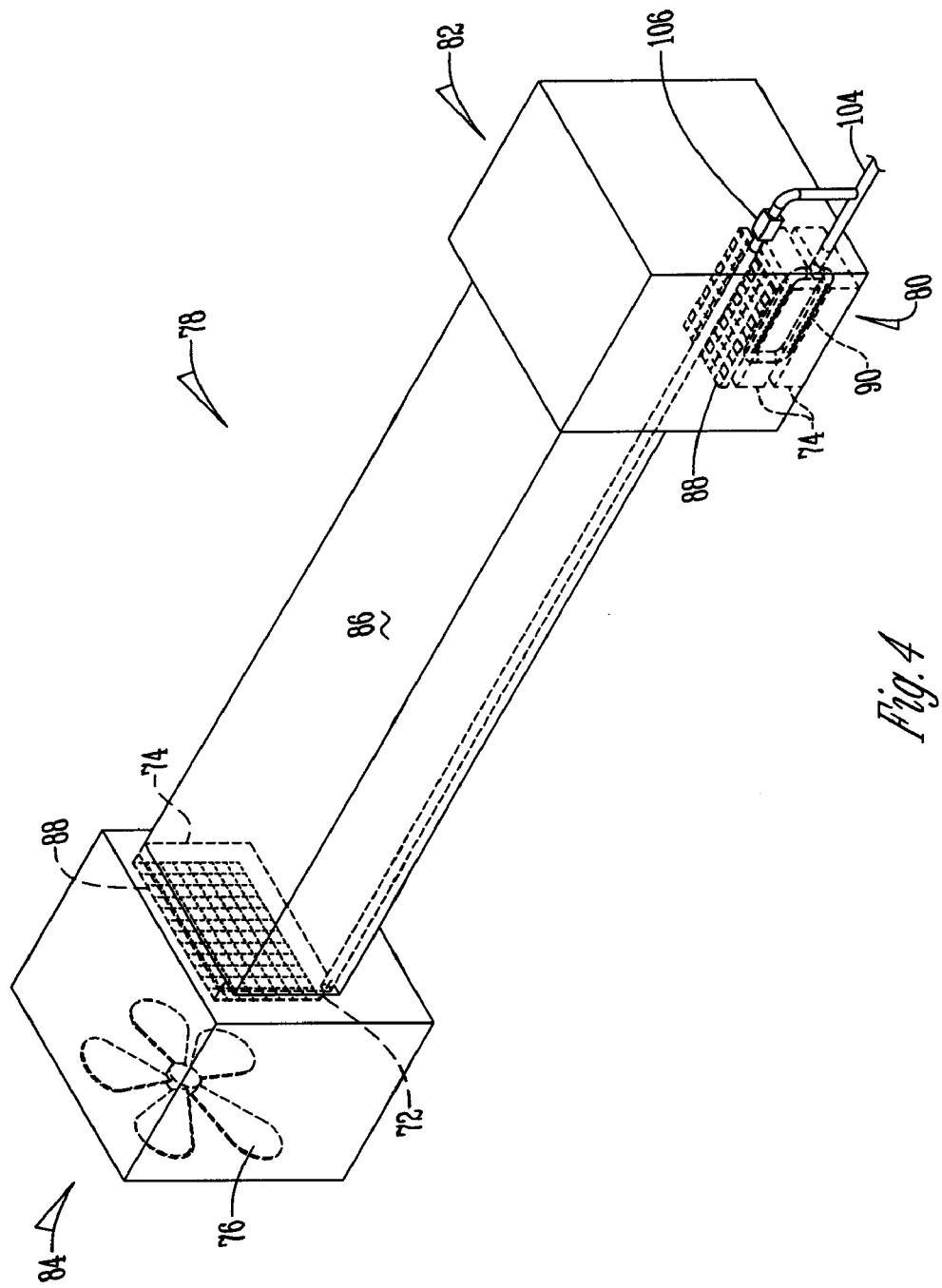
FIG. 4 is a top perspective view of the air filtration system of the present invention.
Figure 5:
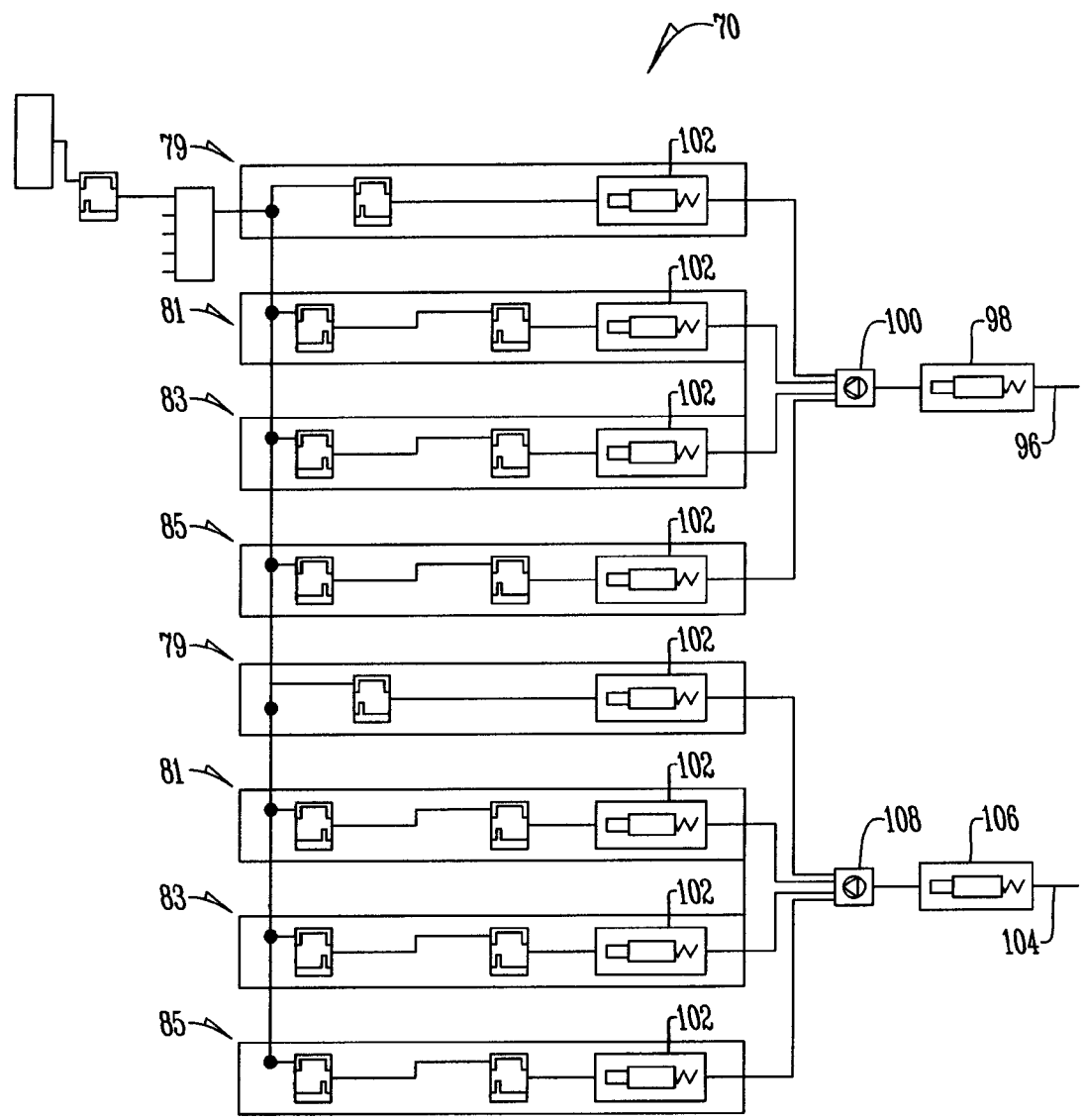
FIG. 5 is a schematic diagram of the air filtration system of the present invention.
Figure 6:
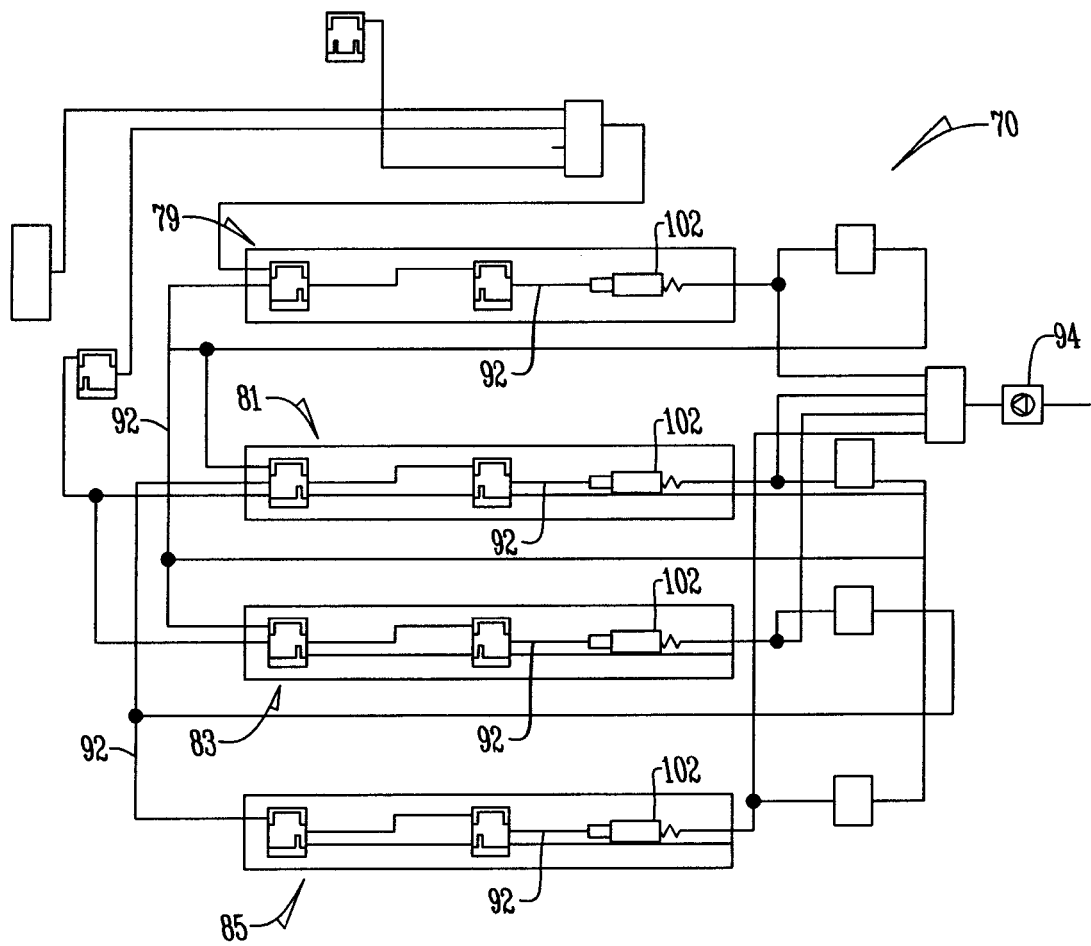
FIG. 6 is a schematic diagram of the air filtration system of the present invention.

With reference to the Figures, presented is a system 10 and method used at a hog facility 12 to reduce the amount of Nh3 (ammonia) emissions that are produced by the facility 12. A conventional hog confinement facility 12 has a plurality of stalls 14 that are used by the hogs. The floor 16 of the stalls 14 present a plurality of slats 18 that are spaced apart so that fecal matter and urine is pushed through openings 20 between the slats 18 by the hogs and pigs walking over the fecal matter. Supporting the slats 18 is a plurality of lintels 22 that are centered every 10 feet on center. Below the slats 18 of the floor 16 is a waste storage compartment 24.

The system 10 of the present invention presents a plurality of injection pipes 26 that are entered from the surface 16 of the individual slats 18 to just below or level to the bottom 28 of each individual slat 18. This allows introduction of water to be precipitated over the surface area of the stored waste 30 contained beneath the floor 16 area within the storage waste compartment 24. Each injection pipe 26 conveys fluid to a plurality of precipitation nozzles 32. Each of the precipitation nozzles 32 is desired to be at the highest location in the compartment 24 to ensure fluid sprayed therefrom is sprayed over a maximum area. Specifically, one precipitation nozzle 32 is required every 10 feet in the width of the building 12 dimension. The spacing of the first precipitation nozzle 32 shall be placed starting 10 feet from the end wall 34 and every 20 feet thereafter. This ensures full coverage of the stored waste 30 surface area. In a barn 12 that is 40 feet by 200 feet, four rows 36 of injection pipes 26 would be required with 11 nozzles 32 per row 36.

Specifically, the four rows (zones) 36 preferably would comprise one-inch plastic schedule 40 pipe 38 that is secured to the ceiling or the bottom 28 of the slats 18. Above each row 36 of nozzles 32 the pipes 38 are connected with ¾ inch rubber hose 40. The last nozzle 32 is connected to a 90 degree elbow 42 and each zone 36 is terminated at the $11^{th}$ nozzle 32 of each row 36.

The injection pipes 26 are fluidly connected to a barrel 44 that is secured to a wall 46 of the barn 12 wherein the barrel 44 in a preferred embodiment contains 30 gallons of fresh water 48. Specifically the water 48 is treated and processed for human consumption and is free of rust and bacteria that could cause contamination. Therefore the water used is rated safe for human consumption to ensure no bacterial activity to accumulate in filters or in the injector heads used to precipitate the water to the surface of the waste materials 30. In the water supply on the farm it is imperative that it is also treated to stop all bacterial activities such as the bacteria that feed on iron within the water supply as is common in many water supplies both on the farm and in residential areas. Chlorination of the water or in having water tested to find out what the Iron levels are is important to insure filters, precipitation heads 32 do not become partially blocked due to contamination caused by bacterial activity.

The water supply is isolated from the water source utilizing the barrel 44 or other storage container and includes proximity switches or electrical ball float 50, to regulate filling of the tank 44 in place. A water pump 52 is fluidly connected to the barrel 44 and is used to pressurize a manifold 54 using solenoid valves 58 to control each of the four zones 36, one at a time. The water pump 52 is regulated by the programming of a computer 60 that is electrically connected to the barrel 44.

A neutralizer solution tank 62 is also provided adjacent the water tank or barrel 44 and contains neutralizer formulation 64. In one embodiment, the neutralizer solution tank 62 is of the same size of the barrel 44 and has the same features, including proximity switches or electrical ball float 50, to regulate filling of the tank 62 in place. The neutralizer solution tank 62 includes an injector pump 66 for fluidly communicating neutralizer formulation 64 from the neutralizer solution tank 62 through a neutralizer solution line 67 into the manifold inlet line 68 to be supplied to the injection pipes 26 via the manifold 54.

In a preferred embodiment each nozzle 32 has a flow rate of two gallons per minute at 50 psi of line pressure. The run time of the pump 52 can determine the amount of water that is applied by programming the computer 60 to run for a period of one minute to deliver two gallons per nozzle 32 or 22 gallons total addition of water to the surface of the stored waste 30.

The facility 12 additionally has an air filtration system 70 to reduce emissions from the facility 12. Specifically, the filtration system 70 is positioned around the interior of the facility 12 in order to catch all the dust that is airborne by circulating the air inside of the hog barns 12. The system 70 does not ventilate to the outside of the building 12 and instead moves air within the building 12 to purify it of the dust and pathogens that are present. The filtration system 70 has a filter media 72 that in a preferred embodiment is made out of hog hair or synthetic material that allows for water to circulate germicides through the filter 74 to purify and harvest the dust. The system 70 additionally has a plurality of fans 76 that in a preferred embodiment are capable of moving 4800-5000 cubic feet per minute of air with four fans 76 operating in a barn 12 that is 40×200 with a seven foot ceiling 77 will process the air approximately 20.78 times per hour. With each pass the air through filters 74 ensures clean air for breathing. As air goes through the filter media 72 the air vaporizes and produces a neutralizing vapor that reacts to amines, aldehydes, esters, phenols, endols, skatoes and mercaptans which cause the odor that is present in the fecal matter and urine found on the floor of the facility 12.

The filtration neutralizer is formulated using citric acid, borax, terpenes, alcohol, vanilla and water. By the neutralizer and water solution being subject to air flow, evaporation takes place which places the products into a vapor form created by the evaporative process. The neutralizing vapors produced react to the amines, aldehydes, esters, phenols, mercaptans, endols and skatoes plus all the other compounds that are detected as the hog house odor.

The air filtration system 70 includes one or more filtration units 78 to provide the minimum and maximum ventilation and air filtration and treatment for the barn 12, wherein in a preferred embodiment, such as in a barn 12 that is 40×200 with a seven foot ceiling, four filtration units 79, 81, 83, 85 are provided. Each filtration unit 78 includes a filter inlet 80, and a first and second assembly 82, 84. Each filtration unit 78 also includes an air tube 86 and a fan 76 for subjecting the filters 74 within the filter assemblies 82, 84 to air flow and circulating air through the filters 74. Each filter assembly 82, 84 includes two filters 74 having filter media 74, wherein filter retainers 88 are incorporated into each filter assembly 82, 84 adjacent the lateral surface of the filter media 72 of each filter 74 to hold the filters 74 in place while airflow passes through the filters 74 to prevent the filters 74 and filter media 72 from bulging inward. In one embodiment, the filter retainers 88 are formed as a rigid cage having a network of intersecting ¼" stainless steel, dead welded wires.

The filter assemblies 82, 84 also include a closed loop manifold 90. The closed loop manifold 90 is an interconnected rectangular section or loop of conduit connected in fluid communication with the fluid input lines. The manifold 90 is provided over both filters 74 such that the openings within each spaced, elongated section of the manifold supplies fluid to each filter 74 within the filter assemblies 82, 84. In one embodiment, 3/16" holes are drilled within the conduit of the manifold 90 on 3" centers.

A plurality of fluid input lines and fluid circulation lines having pumps and valves are provided to supply, circulate, rinse, and flush fluids to and from the filtration units 78. Specifically, the filtration units 79, 81, 83, 85 include fluid circulation lines 92 and a fluid circulation pump 94 for circulating fluid between each filter assembly 82, 84 of each filtration unit 78 and for circulating fluid between filtration units 79, 81, 83, 85. Water is supplied to each filtration unit 79, 81, 83, 85 from a source of water via a water input line 96 having a water input solenoid valve 98 and a water pump 100. The water input line 96 is connected in fluid communication to the circulation lines 92 of each filtration unit 79, 81, 83, 85 via a filtration unit solenoid valve 102. Similarly, filtration neutralizer solution is supplied to each filtration unit 79, 81, 83, 85 from a neutralizer solution fluid source via a neutralizer solution input line 104 having a neutralizer solution solenoid valve 106 and a neutralizer solution circulation/injection pump 108. The neutralizer solution input line 104 is connected in fluid communication to the circulation lines 92 of each filtration unit 79, 81, 83, 85 via a filtration unit solenoid valve 102. Furthermore, a filtration unit flush line 110 is connected in fluid communication to circulation lines 92 of each filtration unit 79, 81, 83, 85 via a filtration unit solenoid valve 102. The filtration unit flush line 110, through the operation of the pumps and a flush line/dump solenoid valve 112 provided therein flushes fluid from the circulation lines 92 of each filtration unit 78 to the waste storage compartment 24 via a flush line outlet 114.

The air in the hog barn 12 is circulated and is not forced out of the barn 12. Ventilation fans 76 that are within the barn 12 provide the minimum and maximum ventilation for the barn 12 and are subject to temperature set points. The filtration system 70 meanwhile is only designed to re-circulate the air within the room as many times per hour as the fans 76 are capable of moving air through the two filters 74 installed in each unit 78 that allows a solution to be vaporized into the air flow. As air is re-circulated through the filters 74 dust also follows the flow of air and is trapped within the filters 74 to be washed out by the circulation thus creating gray water. The gray water is allowed to circulate, accumulating more dust particles until a predetermined amount of time, such as four days, in which the system 70 dumps and cleans the lines and pumps used for re-circulating the water and neutralizer throughout the filtration system. Temperatures are not affected by the circulating air as no new air is being used other than the heated air provided by environmental equipment also engineered into each barn.

The filtration system 70 functions are controlled by computer programming. In the programming of the filtration system 70 functions, each filter assembly 82, 84 is allowed to fill for one minute transferring 28 gallons of water to each filter 74 and applying each inclusion at a time. After all filters 74 are filled the computer then activates an injector pump 108 to inject the filtration neutralizer into the water flow, preferably at point 1.6 gallons or 21.33 ounces to each filter 74. After the filtration neutralizer is added, the filter assemblies 82, 84 circulate for one minute each and continue to cycle for a predetermined amount of time such as four days during which time all solutions are dumped from the filters 74 and into the waste storage compartment 24 or a pit. Prior to the end of the predetermined amount of time all filters 74 are filled and treated with the filtration neutralizer as the computer 60 continues to add the same inclusion approximately every four hours or after until it is time to discharge the collected dust and saturated water into the waste storage compartment 24 or pit. The residuals collected also serve to further enhance the treatment at the surface of the accumulated manure 30 stored in the waste storage compartment 24 beneath the slats 18.

The purpose of the air filtration system 70 is to collect the compounds into the water and then to neutralizer and collect airborne dust caught up in the flow of the circulated air. It is highly probable that pathogens which are found in the air will be destroyed by being subject to the alcohol, terpenes and not excluding the borax and citric acids which already have claims as germicidal. Vanilla is another chemical that can be used in the system 70 and it has been shown to help lower anxiety in patients as well as serving as a pheromone for sows. Vanilla is also advantageous because it acts to deceive the olfactory system as it confuses the nose to what can be identified as an odor.

In operation, fresh water 48 is directed from the barrel 44 to the water pump 52 through the manifolds 54 and to the nozzles 32 to provide precipitation over the feces and urine contained in the waste storage compartment 24. The Nh3 (ammonia) is then attracted to the water molecules and absorbed forming an aqueous ammonia solution to fall to the surface of the waste 30. The addition of the water is used to harvest the Nh3 from the air and to attract additional ammonia into the fresh water 48 after each application of pure clean water. After two collections, a formulation 64 is incorporated into the flow of the normal application utilizing the precipitation nozzles 32 at a rate of four gallons per minute and allowed to inject for 15 seconds, which equates to one gallon per minute. The formulation 64 is made up by three different ingredients: Water, Citric Acid, and Borax. In the control of Nh3 the Citric Acid produces the acid necessary to react to the base being ammonia. In that conversion Nh4-n (ammonium is formed) by the acid base reaction producing a more stabilized nitrogen to take to the fields and is not toxic to fish and plants as would be ammonia as we know. In the formulation of the neutralizer product a total of 1.81 pounds of citric acid is added to each 8.3 pounds of water along with 0.60 pounds of Borax. This is what builds the final product to react to the Nh3, amines, aldehydes, esters, phenols, endols, skatoes, mercaptans, that are found as the emissions produced by fecal matter and urine at the surface of the pit storage area 24. The use of the borax which is the element (B) is known to stop the bacteria which produces H2s and acts as a germicidal for that one micro-organism. The element B was found in the formation of the earth and is abundant and not considered to be harmful.

When the formulation 64 is added the neutral water 48 becomes acidic in PH and reacts specifically to the aqueous ammonia solution created from the previous applications of water. This reaction converts the Nh3 therein into Nh4-N by the acid base reaction that occurs. By creating Nh4-N the Nh3 ammonia vapors are thus reduced and eliminated. Preferably this process occurs every four hours with the third and sixth application incorporating the neutralizer 64 into the applications to ensure all Nh3 is converted thus adding more anaerobic protection by the conversion. Alternatively, injection of the neutralizer 64 occurs every $12^{th}$ hour and after the systems have been activated to treat the surface of the pit 24 harvesting the compounds into the water then being connected every 12 hours to ammonium, thus reducing the other compounds by the volatile reduction of the gas.

In summary, water alone has the power to absorb compounds into it simply by being precipitated above the stored manure. In that absorption of compounds the water reduces the emission found in the air, but also harnesses those compounds into the water forming a more diluted aqueous ammonia solution, but more importantly converting the gas Nh3, from a vapor phase back to a liquid phase. In addition, other compounds are also absorbed into the water and Nh3 is only used as a comparison to the significant of what the water is able to do. In the capturing of the ammonia into the water the stage is now set for conversion to take place by liquid to liquid phase being the neutralizer and the aqueous ammonia liquids that have just been absorbed. In this process what was a base release being the Nh3 it has now been altered to become ammonium which carries with it a base being the collected Nh3. With the titration of the newly established product being harnessed it can now move within the mass of the stored manure making the manure more basic to fight the short chain fatty acids found at the depth of the waste storage compartment 24 or pit produced by the anaerobic bacteria. The by-product of the anaerobic bacteria would be hydrogen sulphide, hexanolic, Butanolic, heptanolic, propanolic acids are better stated the ones that carry the worst of the emission produced by decomposition and in the anaerobic environments.

Therefore, the by-products of the emission produced by the aerobic bacteria are converted to be a usable neutralizer for the anaerobic environment converting both acids and bases to Nh4-n and ammonium salts. Both of the converted products are environmentally friendly as ammonium is basic for plant foods and is viewed as an acceptable source of fertilizer. In the conversion of gas to liquids both events occur by the chemical reaction or better referred to as the acid base reaction. As vapors are collected a liquid phase is produced in which that liquid phase now reacts to the other gasses associated from the anaerobic environment also converting those gasses back to a liquid. In the neutralizing of the gas form to a liquid form the release of odor molecules are kept within the manure and allows more stable plant source once the manure is taken to the fields. Thus, you do not have the gas release of the liquids being spread on the ground which also reduces the odor emission typically found by all gasses being tied up as a liquid.

Another significant part of the acid used to react to the ammonia is the other known features which are offered by gas reduction. Mercaptans are reduced in the presence of an acid. By this reduction of odor the compound is now reduced in the presence of the acid making it less offensive to breath. Furthermore, the odor molecules of the amines, aldehydes, esters, endols, and skatoes are also reduced by the gas being converted to the liquid phase and taken out of the air by that conversion. Absorption and conversions are highly known in our applications by the addition of the neutralizer suppressing gas emissions that are otherwise emitted and drift away from the operations for people to have to breathe and tolerate.

Water being precipitated onto the surface of the waste materials 30 is significant to the absorption of the gas molecules into the water. A water droplet does not just falling into the liquid phase of introduction. It bounces in and with each bounce collects more gas by the reaction of an air barrier that surrounds each droplet of water. It is possible for most water droplets to bounce three to four times before collating into the mass of the liquid being the stored manure 30. As each water droplet is push back out of the mass by the air that surrounds the water droplet the water is still pure, but with each bounce draws more compounds into each droplet further reducing the emissions located directly above the mass of the decomposing manure 30. One droplet produces 3-4 times greater reaction than just introducing itself into the mass thus more reactions are produced by one droplet than could typically be understood by this reaction. The same holds true as when the acid is added to the water forming the acid rain produced above the mass of highly toxic compounds being all the by-product produced by decomposition of fecal matter and urine and within the pit area or waste storage compartment 24 storing the mass of the liquids. It is in the collection of the gas molecules into the liquid phase, (the water) that an immediate reduction is sensed in the room 12 that the applications are being made. More importantly are the conversions that are now possible after the collection from the gas phase is introduced into the liquid phase that the acids provided in the liquid phase can now stabilize and hold the emissions as converted compounds being more stable for use in the agriculture applications.

Specifically, water effectively acts as a sponge that is neutral in the pH scale. Thus, water can be influenced to be either acidic or basic because the pH level of water is near 6.9-7.0 the water is a good sponge to soak up either acid or bases. With vapors or other compounds, they too are transferred by conduction. The reduction of oxidation by converting the gases to a harmless compound known as ammonium or Nh4-n while ammonia is a toxic chemical once it's converted to ammonium, an inert and harmless substance is created.

The air filtration system 70 has cool cells 78 that vaporize the filtration neutralizer in the air. An atomization process mist is applied to the filters 74 to provide for cleaning. Specifically, each filter 74 needs to be cleaned and treated including the filtering of incoming air that is not within the barn 12. All air that is pulled into the barn 12 is also filtered of pathogens and airborne dust that is eventually circulated through the filtration system 70, making the air purified and free of odors.

By using the air filter system 70 one is able to utilize water to circulate through a filter media 72 and injecting the formulated filtration neutralizer into the flow to reduce the compounds that are produced from the fecal matter and urine found on the floor 16 of the facility 12. As gasses are produced by the aerobic bacteria and the associated odors become airborne. As they become more concentrated by reduced ventilation the accumulation of the gases become quite noticeable. Using the same process as described below the slats 18, gas levels can be reduced by absorption and conversions within the water that is passing through the filters 74. Just as liquid acid act to a liquid base, so do acidic vapors react to basic vapors.

With the applications of the aerobic treatment process along with collections of compounds generated by the fecal and matter on the floor 16 which produce odor, dust and contaminates of the air accumulates to layers found on the fences and equipment. Both of these processes served to improve the air quality and life of all that enter into and around the facility commonly known to be offensive.

Thus, provided is an improved system 10 and method for eliminating Nh3 emissions within a hog confinement facility 12. Specifically, a combination of pure water from precipitation nozzles 32 with a treatment of the solution discussed causes the harmful Nh3 emissions to convert into non harmful Nh4-N eliminating the ammonia. Thus, at the very least all of the stated objectives have been met.

What is claimed is:

1. A system of reducing ammonia emissions comprising:
a facility having a waste storage compartment below a floor comprised of slats with openings therebetween;
a plurality of injection pipes attached to a bottom surface of the slats;
wherein each of the plurality of injection pipes includes a plurality of precipitation nozzles;
an air filtration system positioned within the interior of the facility; and
wherein the air filtration system comprises a plurality of filtration units having at least one filter and a fan for circulating air within the facility through the at least one filter.

2. The system of claim 1 wherein each of the plurality of injection pipes are entered from a surface of the slats through an opening between the slats.

3. The system of claim 1 wherein each of the plurality of injection pipes are connected in fluid communication to a fluid storage container.

4. The system of claim 3 wherein each of the plurality of injection pipes are connected in fluid communication to the fluid storage container by a manifold.

5. The system of claim 4 wherein a water pump is connected in fluid communication to the fluid storage container to pressurize the manifold using solenoid valves in each of the plurality of injection pipes.

6. The system of claim 1 wherein each of the plurality of filtration units include fluid lines in fluid communication with the filtration units which supply fluid to the at least one filter.

* * * * *